United States Patent
Sonoda (10) Patent No.: US 7,515,671 B2
(45) Date of Patent: Apr. 7, 2009

(54) METHOD FOR CORRECTING JITTER OF TRANSMISSION DATA

(75) Inventor: Yoko Sonoda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 751 days.

(21) Appl. No.: 10/755,729

(22) Filed: Jan. 12, 2004

(65) Prior Publication Data

US 2004/0141576 A1 Jul. 22, 2004

(30) Foreign Application Priority Data

Jan. 15, 2003 (JP) ............................. 2003-007108

(51) Int. Cl.
*H04L 7/00* (2006.01)
(52) U.S. Cl. ...................... 375/372; 375/371; 369/47.1; 370/516
(58) Field of Classification Search ................ 375/372, 375/371, 354, 377, 211, 213, 214; 341/122, 341/123, 126; 369/47.1, 47.15, 47.35; 370/516
See application file for complete search history.

(56) References Cited

U.S. PATENT DOCUMENTS 6,400,683 B1 *  6/2002  Jay et al. ..................... 370/229
6,456,702 B2 *  9/2002  Nishihara ................. 379/93.05
2004/0042049 A1 *  3/2004  Hulan et al. ................. 358/404

FOREIGN PATENT DOCUMENTS

| DE | 195 39 474 | 4/1997 |
|---|---|---|
| EP | 1 049 280 | 11/2000 |
| EP | 1 096 715 | 5/2001 |
| JP | 2002026922 | 3/2001 |
| JP | 2001-128171 | 5/2001 |
| JP | 2001128171 | 5/2002 |
| WO | WO 99/59279 | 11/1999 |

OTHER PUBLICATIONS

Search Report dated Mar. 2, 2005 for European Patent Appication No. EP 04 00 0559.

* cited by examiner

*Primary Examiner*—Temesghen Ghebretinsae
(74) *Attorney, Agent, or Firm*—Brinks Hofer Gilson & Lione (57) ABSTRACT

Data is transferred from a transmitter to a data buffer of a receiver according to the clock of the transmitter. When the amount of data in the data buffer exceeds an upper limit, the frequency of the reference clock of the receiver is increased to read the data faster, which is transferred to a digital-to-analog converting and audio amplifying section. When the amount of data falls below the upper limit, data is read at the original frequency of the reference clock of the receiver. When the amount of data falls below a lower limit, the frequency of the reference clock of the receiver is decreased.

31 Claims, 6 Drawing Sheets

METHOD FOR CORRECTING JITTER OF TRANSMISSION DATA

This application claims the benefit of Japanese Patent Application No.: 2003-007108, filed on Jan. 15, 2003, which is incorporated herein by reference.

BACKGROUND OF THE INVENTION

1. Field of the Invention

The present invention relates to a method for correcting jitter of transmission data. In particular, the present invention relates to a method for correcting jitter of transmission data that arises from a clock frequency difference between devices operating with independent clocks when sound or music data that requires real-time characteristics is transmitted between such devices for playback of the data.

2. Description of the Related Art

Information, including sound and music data, may be transmitted and received between devices through a wireless connection such as BLUETOOTH or wireless LAN. A variety of audio and video systems are proposed in which a DVD player or a personal computer that plays back and displays video images, a CD players an FM tuner or similar source devices are wirelessly connected to a speaker which outputs sound signals from such devices received by the wireless connection.

Figure 7:
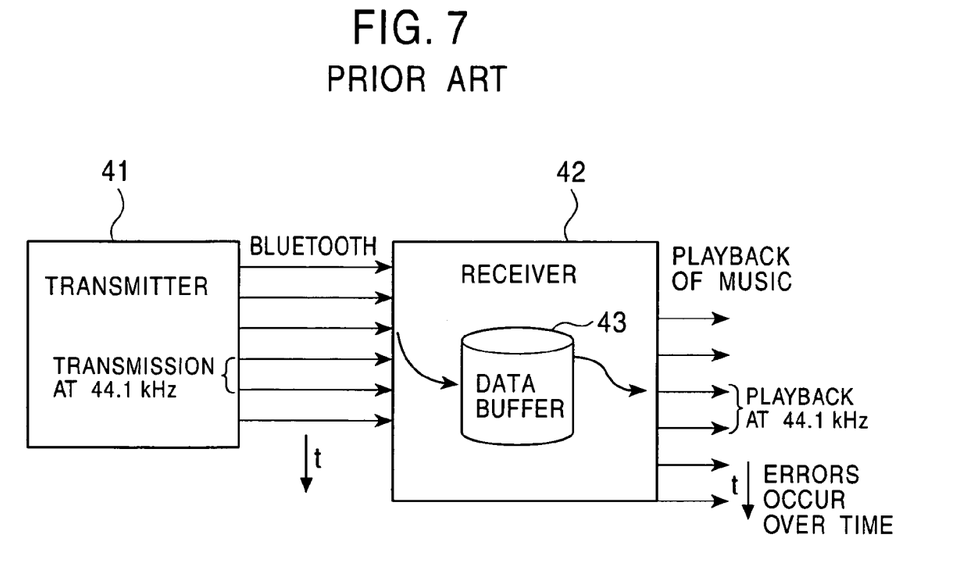
FIG. 7 shows an example of an audio system according to the known art, illustrating how sound data is transmitted and played back.

FIG. 7 shows an example of an audio system according to the known art, illustrating how sound data is transmitted and played back.

The audio system according to the known art shown in FIG. 7 includes a transmitter 41 (source device) that plays back or generates sound or music data (hereinafter, both sound and music data together or separately may be referred to as music data), such as a DVD player, a personal computer, a CD player, or an FM tuner; and a receiver 42 having a digital-to-analog (D/A) converter (not shown), an audio amplifier (AMP) (not shown), and a speaker (not shown) connected thereto. The receiver 42 includes a data buffer 43 for temporarily storing data. The receiver 42 receives music data in packets from the transmitter 41 into the data buffer 43, transfers the music data from the data buffer 43 to the digital-to-analog converter, and finally outputs the data from the speaker.

In the known audio system described above, the transmitter 41 and the receiver 42 are operated based on their respective reference clocks, which are independent of each other. Let us assume that the transmitter 41 has a reference clock of nominally 44.1 kHz, which is the sampling frequency of music data, and breaks music data into packets to transmit the data to the receiver 42 according to the 44.1-kHz reference clock. Under this assumption, the receiver 42 receives the packets of music data from the transmitter 41 and sequentially stores the received music data into the data buffer 43 according to the reference clock of the transmitter 41. The data buffer 43 operates on a FIFO scheme and can normally store about 200 ms of data.

The receiver 42 reads out the music data stored in the data buffer 43 according to its 44.1-kHz reference clock and transfers the music data to the digital-to-analog converter. The music signals are converted to analog signals through the digital-to-analog converter, amplified through a device such as the audio amplifier and are then output from the speaker.

For example, Japanese Unexamined Patent Application Publication No. 2001-128171 discloses a technology that allows sound and music to be transmitted wirelessly between devices as described above.

In the known method for transmitting data, the transmitter 41 and the receiver 42 are provided with respective reference clocks, which are independent of each other. The nominal reference clock frequency of the receiver 42, may not completely match that of the transmitter 41. The data buffer 43 in the receiver 42 is used to accommodate this difference between the nominal frequencies of the reference clocks.

The known art described above, however, has a disadvantage in that while music data is being read from the data buffer 43 for continuous playback, the data buffer 43 may become empty or full due to the difference in reference clock frequencies, thus generating jitter that causes unpleasant sound artifacts during playback, such as skipping of the music data being played back, or other sounds not faithfully reproducing the data that has been received over the wireless connection.

SUMMARY OF THE INVENTION

Accordingly, an embodiment of the present invention provides a method for correcting jitter of reproduced transmission data arising from a clock frequency difference between devices operating with independent reference clocks, when sound or music data that requires real-time characteristics is transmitted in packets between such devices for playback of the data, thus overcoming the problems associated with the known art.

According to, an aspect of the present invention, a method is provided for correcting jitter of data transmitted from a transmitter to a receiver having a data buffer therein, the transmitter and the receiver operating with clocks that are independent of each other. Jitter arises from a difference in the clock frequencies of the transmitter and the receiver. To correct such jitter of transmission data, data in the data buffer is read with the clock frequency of the receiver changed so that the amount of data in the data buffer is maintained within a predetermined range.

By setting an upper limit and a lower limit for the amount of data in the data buffer, the frequency of the clock of the receiver may be controlled to increase when the amount of data in the data buffer exceeds the upper limit or to decrease when the amount of data in the data buffer falls below the lower limit.

A hysteresis characteristic may be applied to the change of the frequency of the clock by setting a plurality of upper limits and a plurality of lower limits.

According to another aspect of the present invention, a method is provided for correcting jitter of data transmitted from a transmitter to a receiver having a data buffer therein, the transmitter and the receiver operating with clocks that are independent of each other. Jitter arises from a difference in the clock frequencies of the transmitter and the receiver. To correct such jitter of transmission data, the data output from the data buffer is resampled to change the frequency of the data output component and reading the data from the data buffer so that the amount of data in the data buffer is maintained within a predetermined range.

By setting an upper limit and a lower limit for the amount of data in the data buffer, the frequency of the data output component may be controlled to increase when the amount of data in the data buffer exceeds the upper limit or to decrease when the amount of data in the data buffer falls below the lower limit. The output data is resampled prior to digital-to-analog conversion.

A hysteresis characteristic may be applied to the change of the frequency of the data component by setting two upper limits and two lower limits.

As described above, the data stored in the data buffer can be controlled within a range from a lower data quantity limit to an upper data quantity limit, thus preventing the data buffer from becoming empty or full. This approach offers advantages in that the generation of jitter can be suppressed and the data buffer can be small in size.

Thus, it is possible to correct such jitter of transmission data arising from a clock frequency difference between devices operating with independent clocks when sound or music data that requires real-time characteristics is transmitted in packets between such devices for playback of the data, and reproduction of the data for observation by listeners.

In the context of music data playback, a person skilled in the art will recognize that a real-time characteristic should preferably avoid the human perception of an objectionable delay between the source data transmission and the auditory response and, once the play back of the data has begun, the audio output is perceived to be continuous. There may be delays associated with the initialization of the apparatus and the commencement of audio output, but these are temporally small compared with the overall length time duration of typical musical selections.

An advantage of the present invention is that the clock frequency of the source data and the initial clock frequency of the receiver reference clock need be only within the established frequency tolerance for the specific device and data type, and the method adjusts frequency of the receiver reference clock, thus managing the data buffer capacity to avoid data loss due to overflow or underflow.

A further advantage of having a data buffer whose data content can be managed by a method of the present invention is the known problem with wireless data transmission that there may be occasional data loss due to external factors. Providing that the duration of the data lost is equivalent to less than about half the receiving data buffer capacity, retransmission of lost data may be requested from the transmitter by the receiver. During such retransmission period, the quantity of data in the data buffer will decrease, and the receiver reference clock frequency may correspondingly decrease. As the retransmitted data is added to the data buffer, the quantity of data in the data buffer will increase, and the receiver reference clock frequency may be adjusted to bring the system back into an equilibrium state. This feature makes the recovery from transient data loss or error possible without humanly observable data reproduction artifacts.

DESCRIPTION OF THE PREFERRED EMBODIMENTS

Methods for correcting jitter of transmission data according to embodiments of the present invention will now be described with reference to the drawings.

Figure 1:
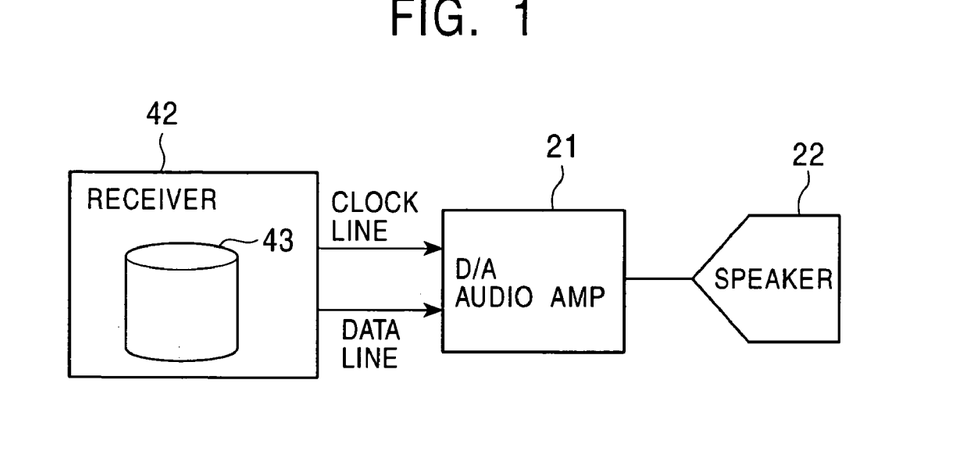
FIG. 1 is a block diagram of an apparatus for correcting jitter of transmission data according to an embodiment of the present invention.
Figure 2:
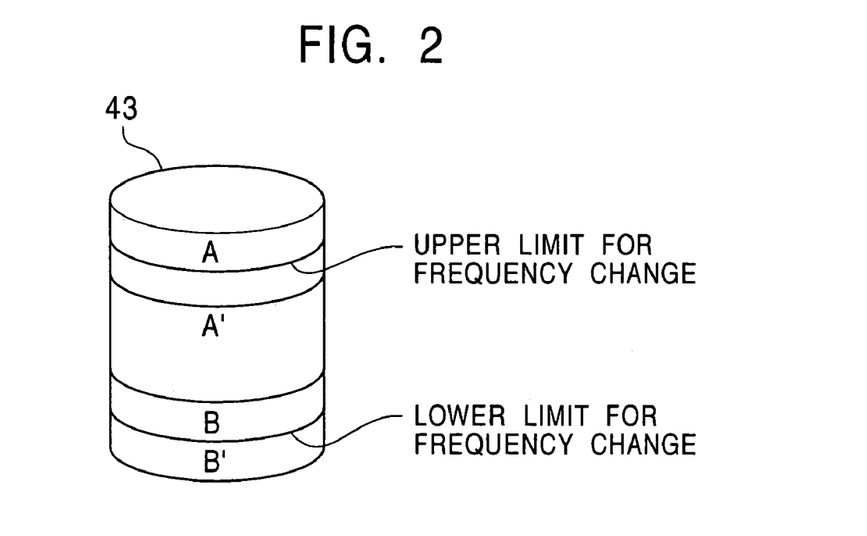
FIG. 2 illustrates the concept of a method for correcting jitter of transmission data according to an embodiment of the present invention.

FIG. 1 is a block diagram of a receiver for correcting jitter of transmission data according to an embodiment of the present invention. FIG. 2 illustrates the concept of the method for correcting jitter of transmission data according to an embodiment of the present invention.

A data reproduction system according to the present invention may be composed as shown in FIG. 1 and may adopt the same data transmission technique as with the known art, an example of which is shown in FIG. 7. According to this embodiment of the present invention, a receiver 42 has a digital-to-analog (D/A) converting and audio amplifying section 21 and a speaker 22 connected thereto. The receiver 42 further includes a data buffer 43 which receives music data transmitted from a transmitter 41 (which may be as shown in FIG. 7). The receiver 42 reads out the music data from the data buffer 43 and then transfers the music data to the digital-to-analog converting and audio amplifying section 21 through a data line together with a clock signal which is transferred through a clock line. The digital-to-analog conversion portion of the D/A audio amplifier 21 converts the digital data read out from the data buffer 43 to an analog signal, which is amplified in the amplifier portion and applied to the speaker 22, thus reproducing the data transmitted from the data source 41 to the receiver 42.

In the above-described structure according to the embodiment of the present invention, the receiver 42 has its reference clock frequency changed depending on the amount of data currently stored in the data buffer 43, and the amount of data is thereby controlled within a predetermined range to prevent the data buffer 43 from becoming empty (underflow) or full (overflow), thus correcting the occurrence of jitter.

More specifically, according to this embodiment of the present invention, an upper limit A and a lower limit B' are set, as shown in FIG. 2, that specify the upper limit and lower limit, respectively, of the amount of data stored in the data buffer 43. These limits are established such that they lie within the physical or logical data buffer limits and sufficiently distant from the values at which either data overflow or underflow may occur so as to preclude said effects from occurring. In this manner, data is read from the data buffer 43 such that the amount of data normally falls approximately within the range from the lower limit B' to the upper limit A.

According to this embodiment of the present invention, when the amount of data in the data buffer 43 exceeds the upper limit A, the frequency of the reference clock of the receiver 42 is increased to read the data faster, followed by transferring the data to the digital-to-analog converting and audio amplifying section 21. Thus, the data in the data buffer 43 is read out faster than new data is stored in the data buffer 43, allowing the amount of data in the data buffer 43 to decrease gradually below the upper limit A. When the amount of data in the data buffer 43 falls below the upper limit A, data is read from the data buffer 43 at the original reference clock frequency of the receiver 42, for example, 41.1 kHz.

On the other hand, when the amount of data in the data buffer 43 falls below the lower limit B', the frequency of the reference clock of the receiver 42 is decreased to read the data more slowly, followed by transferring the data to the digital-to-analog converting and audio amplifying section 21. Thus, the data in the data buffer 43 is read out more slowly than new data is stored in the data buffer 43, allowing the amount of data in the data buffer 43 to increase gradually above the lower limit B'. When the amount of data in the data buffer 43 exceeds the lower limit B', data is read from the data buffer 43 at the original reference clock frequency of the receiver 42, for example, 41.1 kHz.

Figure 3:
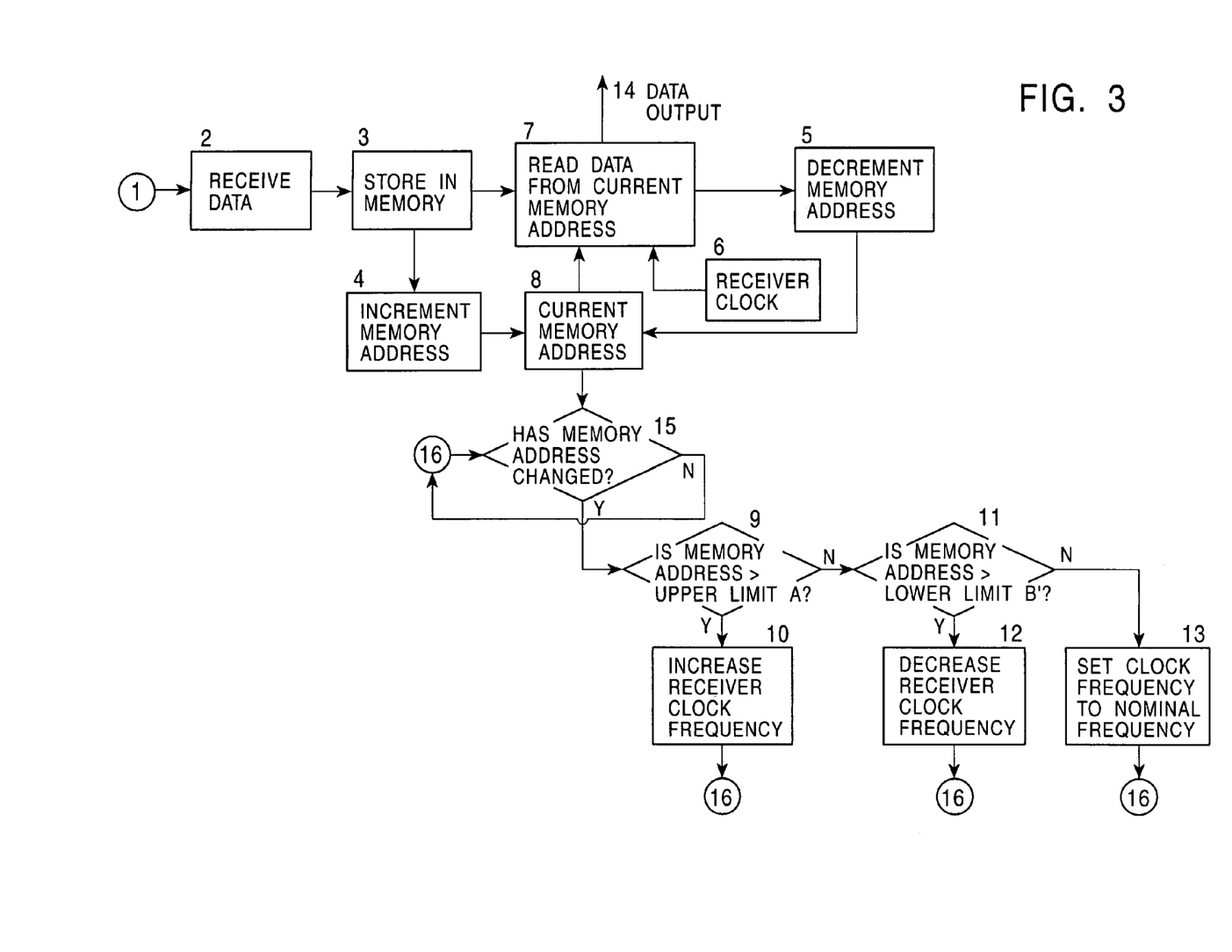
FIG. 3 illustrates the relationship of the steps in an embodiment of the method.
Figure 4:
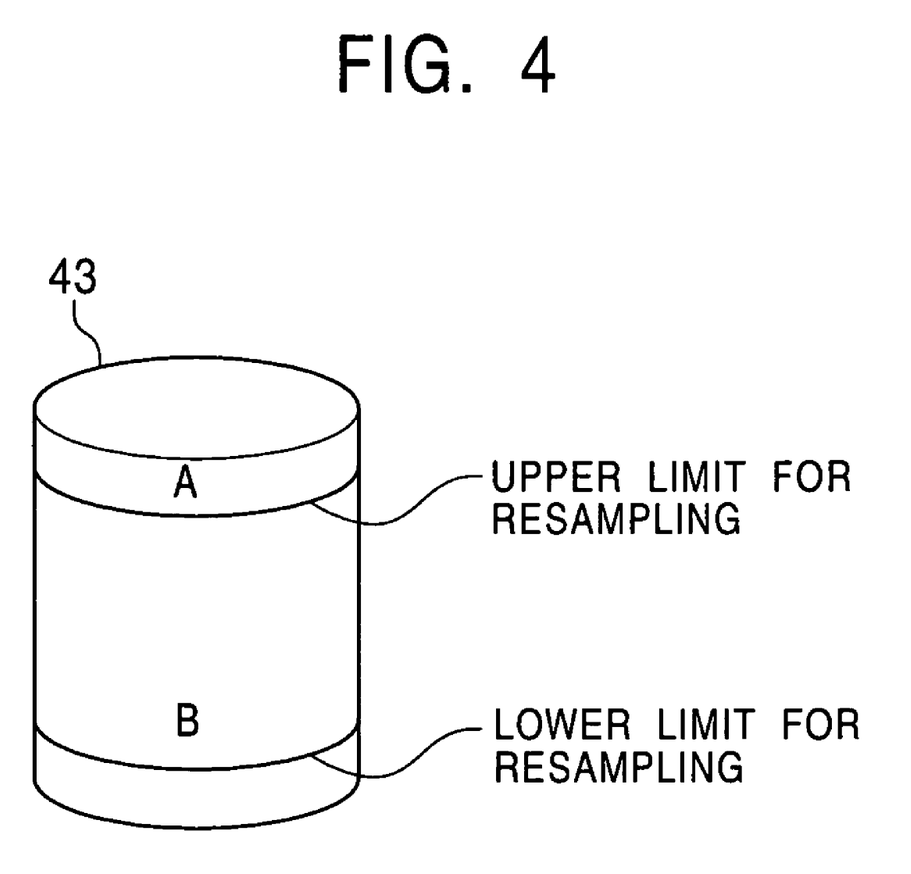
FIG. 4 illustrates the concept of a method for correcting jitter of transmission data according to another embodiment of the present invention.

This embodiment may be further understood with reference to the simplified flow diagram in FIG. 3, illustrating the method from the stage where the data has been received (step 1) by the receiver 42 and the data has been prepared for storage (step 2) in the data buffer 43. The received data, which may be in the form of one or more computer compatible digital elements is stored in memory (step 3). The computer compatible digital element may represent one or more received data packets. An increment to the current memory location value is generated (step 4)(corresponding to the incremental amount of memory associated with a data element).

A receiver clock (step 6) operating at a controllable frequency causes the data to be read from the current address (step 7). The rate at which the data is output (step 14) depends on the frequency of the receiver clock rather than the rate at which data is stored in memory. For this illustration, it is presumed that the memory is implemented as a FIFO, so the current address represents the oldest data in memory, which is that which is desired to be read out. For each data element read out, a decrement to the current memory address is generated (step 5). The result of performing steps 4 and 5 is the computation of a current memory address (step 8) which is used as the address for the next read out of data from memory. The current memory address is now tested to determine if the receiver clock frequency is consistent with the buffer neither overflowing nor underflowing. First the current memory address is tested against the upper limit A (step 9). If the current memory address is greater than A (YES in step 9), the receiver clock frequency is increased (step 10). If the result of step 9 is NO, then the current memory address is tested to determine if it is less than a lower limit B'(step 11). If the current memory address is less than B'(YES in step 11), the receiver clock frequency is decreased (step 12). If the result of step 11 is NO, then the receiver clock frequency is set to a predetermined nominal frequency (step 13).

At the conclusion of the evaluation of the memory address (after steps 10, 12, or 13), the evaluation process returns to wait until there is another change in the current memory address (step 15). Thus, the value of the receiver clock frequency can be evaluated each time that the value is either incremented or decremented. Alternatively, a specific minimum change in the value of the current memory address may be required, minimizing the number of calculations needed if the frequency if the transmitter is slowly varying. The changes made to the receiver clock frequency that are made in steps 10 and 12 may be to increase to a predetermined high frequency or decrease to a predetermined low frequency, respectively. The nominal receiver clock frequency lies between the high frequency and the low frequency. Preferably it may be the about the average of the high and low frequencies.

In the mechanism described above, one upper limit A and one lower limit B are specified. This causes the frequency of the reference clock to change each time the amount of data in the data buffer 43 crosses the upper limit A or the lower limit B'; that is, the frequency of the reference clock changes frequently. To avoid frequent changes of the receiver reference clock frequency, the present invention may allow two upper limits and two lower limits to be specified, thereby applying a hysteresis characteristic to the change of the reference clock frequency.

For example, limits A (upper upper limit) and A' (lower upper limit) where (A>A') may be set for the upper limits. In this approach, the frequency of the reference clock of the receiver 42 is increased when the amount of data in the data buffer 43 exceeds the limit A, and when the amount of data in the data buffer 43 is decreased below the limit A', the original reference clock frequency of the receiver 42 is restored. Similarly, limits B (upper lower limit) and B' (lower lower limit) where (B>B') may be set for the lower limits. The frequency of the reference clock of the receiver 42 is decreased when the amount of data in the data buffer 43 falls below the limit B', and when the amount of data in the data buffer 43 is increased gradually above the limit B, the original reference clock frequency of the receiver 42 is restored. Preferably the tolerance of the frequencies of the reference clocks should be established such that the listener will not perceive a degradation in the quality of the reproduced data. Such a degradation may, for example, be a perception that the reproduced frequencies are not correct.

For illustrative purposes, the target upper and lower frequencies to be shifted from the nominal reference clock frequency of 41.1 kHz may be about 41.2 kHz to 41.5 kHz for the upper frequency and about 41.0 kHz to 39.7 kHz for the lower frequency, depending on the accuracy of the reference clocks of the transmitter 41 and the receiver 42. These settings are based on the fact that the transmitter 41 and the receiver 42 typically use a crystal oscillator to generate their respective reference clocks, and therefore the frequencies of the respective reference clocks may not differ very much from each other.

According to this embodiment of the present invention, the data stored in the data buffer 43 can be controlled by means of the above-described read-out control so that the amount of data mostly falls within the range from the lower limit B' to the upper limit A, thus preventing the data buffer 43 from becoming empty or full. This approach offers advantages in that the generation of jitter can be suppressed and the data buffer can be small in size.

According to the foregoing embodiment of the present invention, data in the data buffer 43 of the receiver 42 is read out by changing the reference clock frequency depending on the amount of data in the data buffer 43. According to the present invention, further advantages can be gained by changing the frequency of the data component by resampling data that has been read out from the data buffer 43.

Figure 5:
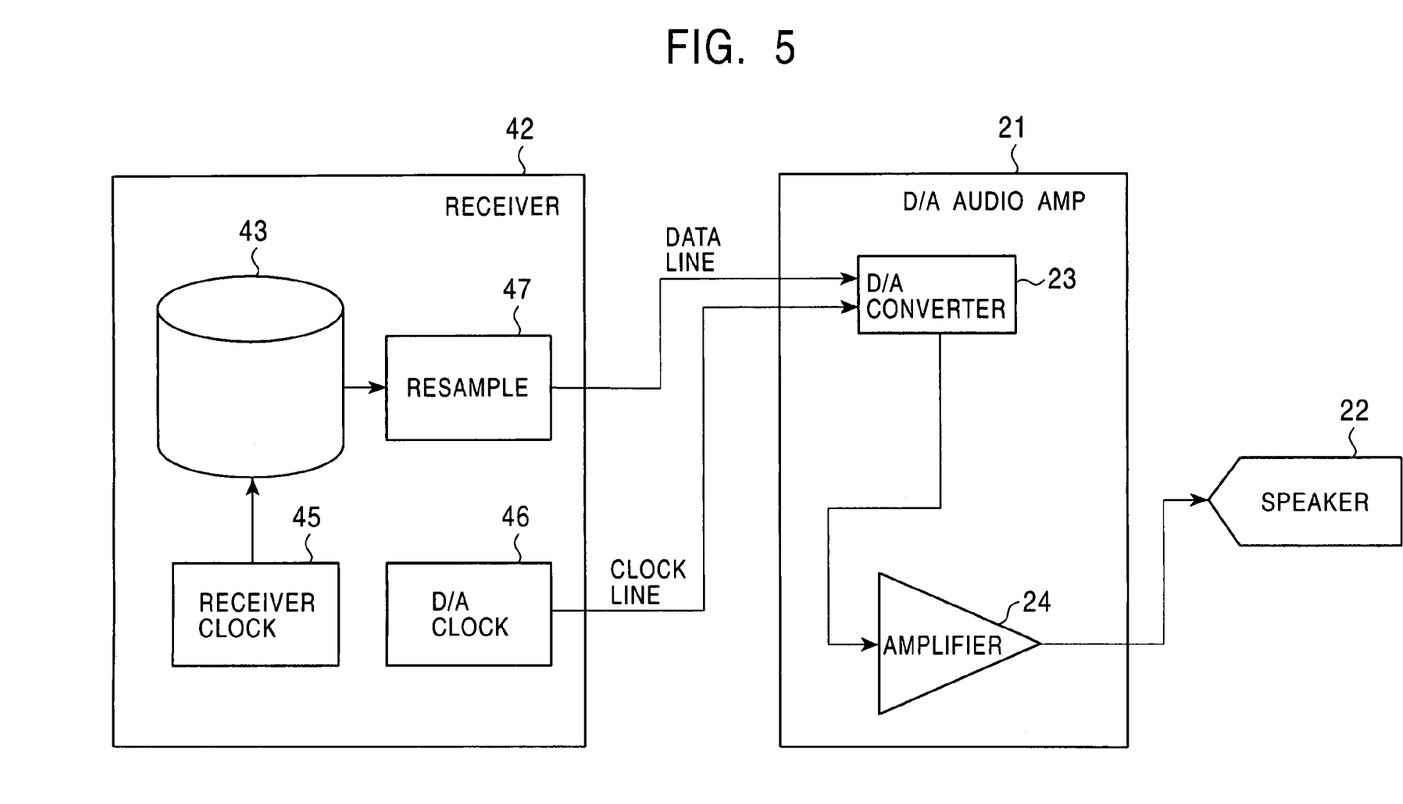
FIG. 5 is a block diagram of an apparatus where the resampling is performed in the receiver.
Figure 6:
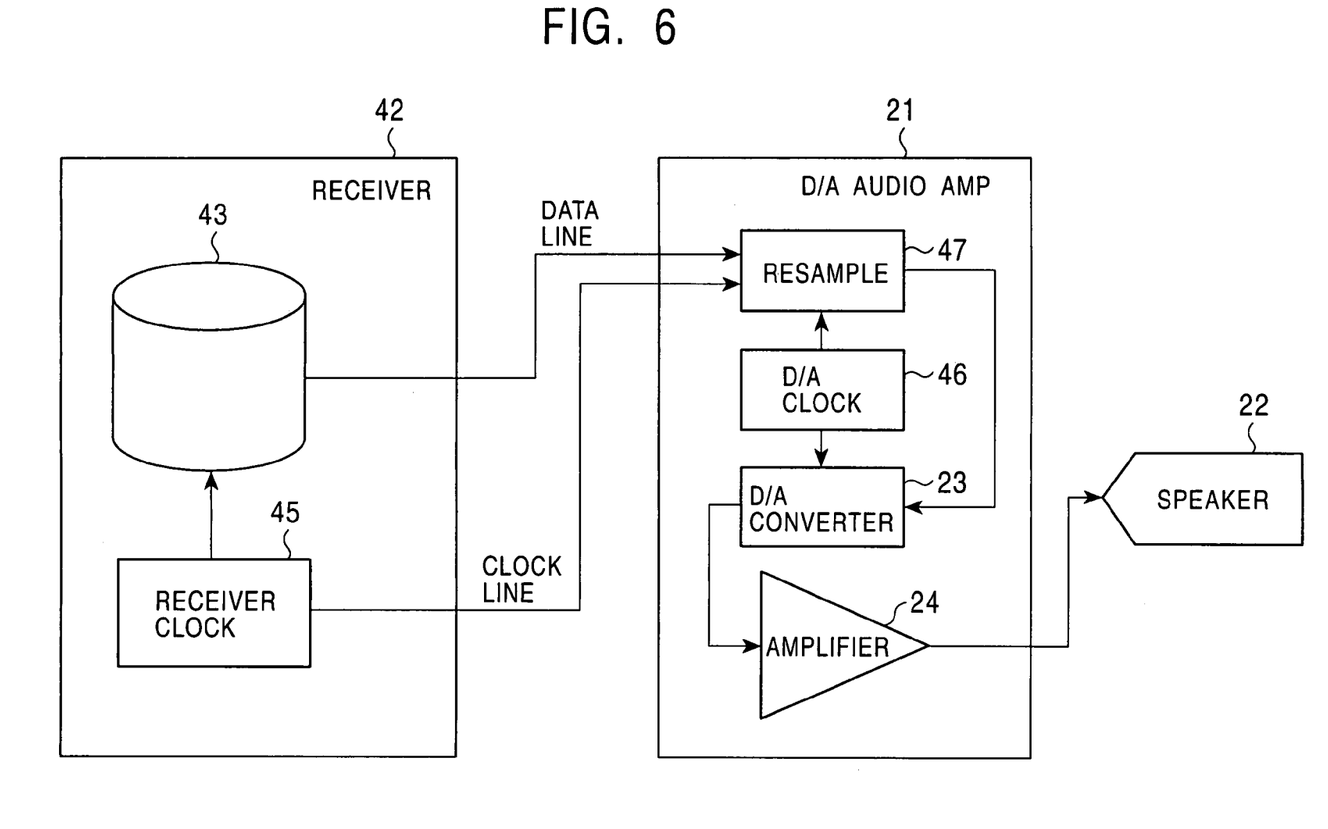
FIG. 6 is a block diagram of an apparatus where the resampling is performed in the digital-to-analog audio amplifier.

FIGS. 5 and 6 illustrate an apparatus capable of performing the method for correcting jitter of transmission data according to additional embodiments of the present invention. According to these embodiments of the present invention, the frequency of the data component is changed by means of resampling the data output from the data buffer. This mechanism will now be described.

According to an embodiment of the present invention, when the amount of data in the data buffer 43 exceeds the upper limit A (FIG. 3), the data output from the data buffer 43 is resampled to decrease the frequency of the data component, followed by transferring the data to the digital-to-analog converting and audio amplifying section 21. Thus, the data in the data buffer 43 is read out faster than new data is stored in the data buffer 43, allowing the amount of data in the data buffer 43 to decrease gradually below the upper limit A. When the amount of data in the data buffer 43 falls below the upper limit A, the data is transferred from the data buffer 43 to the digital-to-analog converting and audio amplifying section 21 without applying resampling to the data.

On the other hand, when the amount of data in the data buffer 43 falls below the lower limit B, the data output from the data buffer 43 is resampled to increase the frequency of the data component, followed by transferring the data to the digital-to-analog converting and audio amplifying section 21. Thus, the data in the data buffer 43 is read out more slowly than new data is stored in the data buffer 43, allowing the amount of data in the data buffer 43 to increase gradually above the lower limit B. When the amount of data in the data buffer 43 exceeds the lower limit B, the data is transferred from the data buffer 43 to the digital-to-analog converting and audio amplifying section 21 without applying resampling to the data.

In each of these circumstances, the D/A clock rate is unchanged, and the resampling has the effect of compensating for the receiver clock frequency change.

An apparatus to accomplish these functions is shown in FIG. 5. The receiver 43 has a receiver clock, which is controlled according to one of the methods previously described so as to prevent either data overflow or underflow. A D/A clock 46, located in the receiver 43 provides a clock frequency to the resampling circuit 47 so as to cause the resampling circuit 47 to output data to the data line at a rate which is independent of the rate at which the data is read out of the data buffer 43 by the receiver clock 45. Thus the rate at which the data is supplied to the digital-to-analog converter 23 is constant, and frequency changes arising from the control of the receiver clock 36 are avoided. The D/A clock 46 is also supplied to the D/A converter 23 through a clock line connecting the receiver 42 and the D/A audio amplifier 21.

As illustrated in FIG. 6, the resampling may also be performed in the D/A audio amplifier 21. In this instance, the data read out from the data buffer 43 by the receiver clock 45 and the receiver clock frequency are supplied to the D/A audio amplifier 21 on the data and clock lines. The data and clock are supplied to the resampling circuit 47 and well as the D/A clock 46, which is located in the D/A audio amplifier 21. The functioning of the circuits is similar to that described in conjunction with FIG. 6 and will not be further described.

While the provision of a separate clock line between the receiver 42 and the D/A audio amplifier 21 is shown, the data may be asynchronous or self clocked.

The functions of one or more of the data buffer, receiver clock, resampling circuit, D/A clock and digital-to-analog converter may be combined in an electronic integrated circuit such as a microprocessor or programmable logic device.

In the above-described embodiments of the present invention, where resampling is used, the target upper and lower frequencies for resampling may be as described with reference to FIG. 2, and two upper limits and two lower limits may also be set to apply a hysteresis characteristic, as described with reference to FIG. 2.

The foregoing embodiment described with reference to FIG. 3 can offer the same advantages as with the embodiment described with reference to FIG. 2.

The two foregoing embodiments according to the present invention have been described by way of an example where data is transmitted between devices through a wireless connection such as BLUETOOTH, wireless LAN or similar technique. The present invention is also applicable to data transmission between devices connected to each other by a cable connection or other data transmission technique, as long as such devices are operated with respective reference clocks that are independent of each other.

Other embodiments according to the present invention will be readily apparent to persons skilled in the art. For example, the following constitute several further alternative embodiments.

The method may be directed towards maintaining the buffer contents near the mean of the limits A and B' or at some value between A and B'. This can be accomplished by either discrete or continuous control of the reference clock frequency.

In an embodiment of the present invention where the frequency of the reference clock is controlled discretely, a series of values of data quantity $A1, A2, \ldots A$ is established between the mean value $(A+B')/2$ and A, spaced at intervals, and $B1, B2, \ldots B'$ between the mean value and B', spaced at intervals. Associated with each data quantity value is a receiver reference clock frequency having an offset from the nominal clock frequency which increases or decreases monotonically as the data quantity value is offset from the mean in a positive or negative direction, respectively. With an appropriate choice of upper, lower and mean reference frequencies, the receiver reference clock frequency will become adjusted to within a small offset from that of the reference clock frequency associated with the source data, and remain within the small offset range. Even if the source data clock frequency varies over time, the reference frequency clock will adjust to adapt to the variation as such variations will change the quantity of data in the data buffer, but avoiding either overflow or underflow.

Another embodiment may be where the frequency offset of the reference clock frequency from the nominal reference frequency is proportional to the difference between the mean value $(A+B')/2$ and the measured value. When the adjustment process has proceeded for some time, a value of reference clock frequency will have been achieved wherein the quantity of data in the buffer is nominally constant.

Further embodiments of the present invention may be where it is desired to maintain the data quantity within some specified value with respect to the mean value $(A+B')/2$. In such instances, the receiver clock frequency may be adjusted by other algorithms to achieve that aim.

Any of the alternative embodiments for controlling the amount of data in the data buffer may be combined with a resampling embodiment.

It will be apparent to those skilled in the art that it may be desirable to devise initialization methods where the buffer is filled to a specified value at the beginning of the data transfer and the receiver reference clock frequency clock is initialized.

Since the data reproduction means may be connected to more than one data source simultaneously, more than one data buffer may need to be managed by an embodiment of the present invention. It is expected that each data source may be associated with a source identifier, and that each data source may have a different clock frequency within the permitted specification range. Each data source may therefore be associated with a separate receiver reference clock frequency. The music data from multiple data sources may be stored in a common memory area or separate memory areas. The appropriate receiver reference clock frequency is selected and controlled based on the data source transmitter.

In the case where the resampling rate has multiple values to accommodate multiple data sources, the control of the values of the multiple resampling rate may be accomplished by the same hardware and a shared buffer memory.

Other embodiments according to the present invention will be readily apparent to persons skilled in the art.

What is claimed is:

1. A method for correcting jitter of data transmitted from a transmitter to a receiver having a data buffer therein, the transmitter and the receiver operating with independent clock frequencies, the method comprising:

receiving the data from a transmitter;

storing the data in the data buffer;

changing the receiver clock frequency used for reading data in the data buffer so that an amount of data in the data buffer is maintained within a predetermined range;

wherein the receiver clock frequency is increased when the data amount is greater than an upper limit and decreased when the data amount is less than a lower limit;

wherein the receiver clock frequency switches to an original value when the data amount falls below an upper limit or when the data amount exceeds the lower limit;

wherein the receiver clock frequency increase or decrease is directly proportional to a difference between the data amount and the upper and lower limits, respectively, and wherein a hysteresis characteristic is applied to the change of the receiver clock frequency by setting a second upper limit and a second lower limit.

2. The method according to claim 1, wherein the receiver clock frequency is controlled to increase from a nominal value when the amount of data in the data buffer exceeds the upper limit and the receiver clock frequency is controlled to decrease from the nominal value when the amount of data in the data buffer falls below the lower limit.

3. The method according to claim 1, wherein a nominal value of the receiver clock frequency is maintained whenever the amount of data lies between the upper limit and the lower limit, and the receiver clock frequency is increased to a high value when the data amount is greater than the upper limit, and decreased to a low value when the data amount is less than the lower limit.

4. The method of claim 2, wherein the receiver clock frequency is increased from the nominal value when the data amount exceeds an upper upper limit and decreased to the nominal amount when the data amount becomes less than a lower upper limit, and the receiver clock frequency is decreased from the nominal value when the data amount is less than the lower lower limit and in creased to the nominal amount when the data amount becomes less than an upper lower limit.

5. The method of claim 1, wherein the data is transmitted by BLUETOOTH.

6. The method of claim 1, wherein the data is transmitted by a wireless LAN.

7. The method of claim 1, wherein the data is transmitted means by a cable connection.

8. The method of claim 1 further comprising:
transmitting data from a plurality of transmitters to one or more receivers;
providing a unique data identification value for each transmitter;
incorporating the unique data identification value in the transmitted data; and
associating one of a plurality of receiver clock frequencies of each of the one or more receivers with each of the unique data identification values, whereby each receiver maintains one of the plurality of the receiver clock frequencies as associated with each of the plurality of transmitters.

9. The method of claim 1 wherein a total interval between a mean of the upper and lower data limits is divided into a set of intervals, and the receiver clock frequency increased or decreased proportionally to the number of the set of intervals between the data amount and the mean.

10. A method for correcting jitter of data transmitted from a transmitter to a receiver having a data buffer therein, the transmitter and the receiver operating with independent clock frequencies, the method comprising:
receiving the data from a transmitter;
storing the data in the data buffer;
changing the receiver clock frequency used for reading data in the data buffer so that an amount of data in the data buffer is maintained within a predetermined range;

wherein the receiver clock frequency is increased when the data amount is greater than an upper limit and decreased when the data amount is less than a lower limit;

wherein the receiver clock frequency switches to an original value when the data amount falls below an upper limit or when the data amount exceeds the lower limit;

wherein the receiver clock frequency increase or decrease is directly proportional to a difference between the data amount and the upper and lower limits, respectively;

transmitting data from a plurality of transmitters to one or more receivers;

providing a unique data identification value for each transmitter;

incorporating the unique data identification value in the transmitted data; and associating one of a plurality of receiver clock frequencies of each of the one or more receivers with each of the unique data identification values, whereby each receiver maintains one of the plurality of the receiver clock frequencies as associated with each of the plurality of transmitters.

11. The method according to claim 10, wherein the receiver clock frequency is controlled to increase from a nominal value when the amount of data in the data buffer exceeds the upper limit and the receiver clock frequency is controlled to decrease from the nominal value when the amount of data in the data buffer falls below the lower limit.

12. The method according to claim 11, wherein a hysteresis characteristic is applied to the change of the receiver clock frequency by setting a second upper limit and a second lower limit.

13. The method according to claim 10, wherein a nominal value of the receiver clock frequency is maintained whenever the amount of data lies between the upper limit and the lower limit, and the receiver clock frequency is increased to a high value when the data amount is greater than the upper limit, and decreased to a low value when the data amount is less than the lower limit.

14. The method of according to claim 12, wherein the receiver clock frequency is increased from the nominal value when the data amount exceeds an upper upper limit and decreased to the nominal amount when the data amount becomes less than a lower upper limit, and the receiver clock frequency is decreased from the nominal value when the data amount is less than the lower lower limit and increased to the nominal amount when the data amount becomes less than an upper lower limit.

15. The method of claim 10, wherein the data is transmitted by BLUETOOTH.

16. The method of claim 10, wherein the data is transmitted by a wireless LAN.

17. The method of claim 10, wherein the data is transmitted means by a cable connection.

18. The method of claim 10, wherein a total interval between a mean of the upper and lower data limits is divided into a set of intervals, and the receiver clock frequency increased or decreased proportionally to the number of the set of intervals between the data amount and the mean.

19. A method for correcting jitter of data transmitted from a transmitter to a receiver having a data buffer therein, the transmitter and the receiver operating with independent clock frequencies, the method comprising:
receiving the data from a transmitter;
storing the data in the data buffer;

changing the receiver clock frequency used for reading data in the data buffer so that an amount of data in the data buffer is maintained within a predetermined range;

wherein the receiver clock frequency is increased when the data amount is greater than an upper limit and decreased when the data amount is less than a lower limit;

wherein the receiver clock frequency switches to an original value when the data amount falls below an upper limit or when the data amount exceeds the lower limit;

wherein the receiver clock frequency increase or decrease is directly proportional to a difference between the data amount and the upper and lower limits, respectively; and wherein a total interval between a mean of the upper and lower data limits is divided into a set of intervals, and the receiver clock frequency increased or decreased proportionally to the number of the set of intervals between the data amount and the mean.

20. The method according to claim 19, wherein the receiver clock frequency is controlled to increase from a nominal value when the amount of data in the data buffer exceeds the upper limit and the receiver clock frequency is controlled to decrease from the nominal value when the amount of data in the data buffer falls below the lower limit.

21. The method according to claim 20, wherein a hysteresis characteristic is applied to the change of the receiver clock frequency by setting a second upper limit and a second lower limit.

22. The method according to claim 19, wherein a nominal value of the receiver clock frequency is maintained whenever the amount of data lies between the upper limit and the lower limit, and the receiver clock frequency is increased to a high value when the data amount is greater than the upper limit, and decreased to a low value when the data amount is less than the lower limit.

23. The method of claim 21, wherein the receiver clock frequency is increased from the nominal value when the data amount exceeds an upper upper limit and decreased to the nominal amount when the data amount becomes less than a lower upper limit, and the receiver clock frequency is decreased from the nominal value when the data amount is less than the lower lower limit and increased to the nominal amount when the data amount becomes less than an upper lower limit.

24. The method of claim 12 further comprising:
transmitting data from a plurality of transmitters to one or more receivers;
providing a unique data identification value for each transmitter;
incorporating the unique data identification value in the transmitted data; and
associating one of a plurality of receiver clock frequencies of each of the one or more receivers with each of the unique data identification values, whereby each receiver maintains one of the plurality of the receiver clock frequencies as associated with each of the plurality of transmitters.

25. The method of claim 19, wherein the data is transmitted by BLUETOOTH.

26. The method of claim 19, wherein the data is transmitted by a wireless LAN.

27. The method of claim 19, wherein the data is transmitted means by a cable connection.

28. A method for correcting jitter of data transmitted from a transmitter to a receiver having a data buffer therein, the transmitter and the receiver operating with independent clock frequencies, the method comprising:
receiving data from the transmitter at a clock frequency associated with the transmitter;
storing a data element in the data buffer, the data buffer being managed as a FIFO memory;
incrementing a current memory address each time a data element is stored in memory;
reading out the data element at the current memory address at a rate determined by the receiver clock frequency;
decrementing the current memory address each time a data element at the current memory address is read out;
comparing the current memory address with an upper value, and setting the receiver clock frequency to a predetermined high value if the current memory address is greater than the upper value;
comparing the current memory address with a lower value, and setting the receiver clock frequency to a predetermined low value if the current memory address is less than the lower value; and
wherein a hysteresis characteristic is applied to setting the receiver clock frequency to a predetermined high or low value by setting two upper values and two lower values, respectively.

29. The method of claim 28, further comprising: setting the receiver clock frequency to a value which lies between the high value and the low value whenever the comparison of the current memory address with the high value and the low value does not result in setting the receiver clock to a high value or a low value.

30. The method of claim 28, wherein when the current memory address is lower than the lower of the two upper values, setting the receiver clock frequency to an original reference clock frequency.

31. The method of claim 28, wherein when the current memory address is higher than the higher of the two lower values, setting the receiver clock frequency to an original reference clock frequency.

* * * * *

UNITED STATES PATENT AND TRADEMARK OFFICE
CERTIFICATE OF CORRECTION

PATENT NO. : 7,515,671 B2 Page 1 of 1
APPLICATION NO. : 10/755729
DATED : April 7, 2009
INVENTOR(S) : Yoko Sonoda

It is certified that error appears in the above-identified patent and that said Letters Patent is hereby corrected as shown below:

In column 9, claim 4, line 35, after "lower limit and" delete "in creased" and substitute --increased-- in its place.

In column 11, claim 24, line 44, after "method of claim" delete "12" and substitute --19-- in its place.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,515,671 B2 | Page 1 of 1 |
| APPLICATION NO. | : 10/755729 | |
| DATED | : April 7, 2009 | |
| INVENTOR(S) | : Yoko Sonoda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this
Third Day of May, 2011

David J. Kappos
*Director of the United States Patent and Trademark Office*